(12) United States Patent
Lobert et al.

(10) Patent No.: US 7,557,536 B2
(45) Date of Patent: Jul. 7, 2009

(54) LIGHT

(75) Inventors: Jonathan Paul Lobert, Sussex, WI (US); Scott David Schneider, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 150 days.

(21) Appl. No.: 11/268,768

(22) Filed: Nov. 7, 2005

(65) Prior Publication Data

US 2006/0113958 A1 Jun. 1, 2006

Related U.S. Application Data

(60) Provisional application No. 60/625,818, filed on Nov. 7, 2004.

(51) Int. Cl.
*H02J 7/00* (2006.01)
(52) U.S. Cl. .................. 320/114; 320/110; 320/112; 320/115
(58) Field of Classification Search .......... 320/115, 320/110, 114, 124, 125, 127, 129; 362/157, 362/208, 195
See application file for complete search history.

(56) References Cited

U.S. PATENT DOCUMENTS

| | | | |
|---|---|---|---|
| 2,517,882 A | 8/1950 | Johnson | |
| 2,525,588 A | 10/1950 | Cameron et al. | |
| 2,822,615 A | 2/1958 | Durst et al. | |
| 4,160,857 A | 7/1979 | Nardella et al. | |
| D266,704 S | 10/1982 | Frezzeolini et al. | |
| 4,447,863 A | 5/1984 | Fenne | |
| 4,586,905 A * | 5/1986 | Groff | 434/307 R |
| 4,596,905 A * | 6/1986 | Fowler | 200/5 A |
| 4,654,764 A | 3/1987 | Hsiao | |
| 4,833,782 A | 5/1989 | Smith | |
| D315,282 S | 3/1991 | Schmidt et al. | |
| 5,043,854 A | 8/1991 | Gammache | |
| 5,097,399 A | 3/1992 | Gammache | |
| 5,161,095 A | 11/1992 | Gammache | |
| 5,169,225 A | 12/1992 | Palm | |
| D332,320 S | 1/1993 | Gammache | |

(Continued)

FOREIGN PATENT DOCUMENTS

DE 8521614 1/1986

(Continued)

OTHER PUBLICATIONS

Makita 1992 Catalog, p. 14, showing Model ML 700 incandescent flashlight.

(Continued)

*Primary Examiner*—Akm E Ullah
*Assistant Examiner*—Nguyen Tran
(74) *Attorney, Agent, or Firm*—Michael Best & Friedrich LLP

(57) ABSTRACT

A battery-powered light including a body, a light source and a control circuit. The body includes a battery support portion and houses the light source. The battery support portion is operable to physically support a battery pack. The light source is electrically connectable to the battery pack and able to receive a discharge current from the battery pack. The light source also is operable to emit light. The control circuit is supported by the body and is operable to control the discharge current being supplied to the light source.

17 Claims, 18 Drawing Sheets

U.S. PATENT DOCUMENTS

| | | | |
|---|---|---|---|
| 5,190,369 A | 3/1993 | Pace | |
| 5,213,412 A | 5/1993 | Ciallella | |
| 5,250,891 A | 10/1993 | Glasgow | |
| 5,255,168 A | 10/1993 | Stevens | |
| 5,278,739 A | 1/1994 | Gammache | |
| 5,294,874 A | 3/1994 | Hessenberger et al. | |
| 5,455,751 A | 10/1995 | Lynch et al. | |
| D370,542 S | 6/1996 | Santarsiero | |
| D372,319 S | 7/1996 | Carbone | |
| 5,541,822 A | 7/1996 | Bamber | |
| D373,210 S | 8/1996 | Santarsiero | |
| D373,211 S | 8/1996 | Heun | |
| D373,649 S | 9/1996 | Carbone | |
| D375,570 S | 11/1996 | Hayakawa et al. | |
| D375,811 S | 11/1996 | Hon | |
| 5,605,394 A | 2/1997 | Chen | |
| 5,637,035 A | 6/1997 | Yee | |
| D387,455 S | 12/1997 | Zurwelle | |
| D388,201 S | 12/1997 | Zurwelle | |
| D390,987 S | 2/1998 | Zurwelle | |
| D392,759 S | 3/1998 | Howard et al. | |
| D398,410 S | 9/1998 | Fell et al. | |
| 5,853,241 A | 12/1998 | Sharrah et al. | |
| D404,839 S | 1/1999 | Petterson et al. | |
| D405,204 S | 2/1999 | McAdams et al. | |
| D405,552 S | 2/1999 | Howard et al. | |
| D406,372 S | 3/1999 | Matthes et al. | |
| D406,374 S | 3/1999 | Porter | |
| D410,293 S | 5/1999 | Prince | |
| 5,912,428 A * | 6/1999 | Patti | 102/215 |
| D413,994 S | 9/1999 | Clowers et al. | |
| 5,973,497 A * | 10/1999 | Bergk et al. | 324/428 |
| 5,988,828 A | 11/1999 | Prince et al. | |
| D422,730 S | 4/2000 | Byler et al. | |
| D427,346 S | 6/2000 | Schoen | |
| D427,697 S | 7/2000 | Brazell et al. | |
| D428,175 S | 7/2000 | Lynch et al. | |
| D436,204 S | 1/2001 | Leen | |
| 6,169,373 B1 | 1/2001 | Riesinger | |
| D438,316 S | 2/2001 | Etter | |
| 6,222,343 B1 | 4/2001 | Crisp et al. | |
| 6,227,677 B1 | 5/2001 | Willis | |
| 6,236,177 B1 | 5/2001 | Zick et al. | |
| D444,582 S | 7/2001 | Poon | |
| D450,147 S | 11/2001 | Leen | |
| D451,222 S | 11/2001 | Poon | |
| 6,340,880 B1 * | 1/2002 | Higashijima et al. | 320/162 |
| D454,040 S | 3/2002 | Wadsworth | |
| 6,364,580 B1 | 4/2002 | Dils et al. | |
| 6,388,390 B2 * | 5/2002 | Rachwal | 315/200 R |
| 6,456,035 B1 | 9/2002 | Crisp et al. | |
| 6,457,841 B1 | 10/2002 | Lynch et al. | |
| D467,375 S | 12/2002 | Lynch et al. | |
| 6,502,949 B1 | 1/2003 | Horiyama et al. | |
| 6,605,926 B2 | 8/2003 | Crisp et al. | |
| D483,888 S | 12/2003 | Pokorny et al. | |
| D485,382 S | 1/2004 | Palm | |
| D489,144 S | 4/2004 | Dalton, Jr. | |
| 6,808,287 B2 * | 10/2004 | Lebens et al. | 362/184 |
| 6,809,499 B2 * | 10/2004 | Solingen | 320/114 |
| D498,549 S | 11/2004 | Campagna | |
| 6,847,146 B2 | 1/2005 | Hessenberger et al. | |
| 6,902,293 B2 * | 6/2005 | Tang | 362/183 |
| D509,919 S | 9/2005 | Durgan et al. | |
| 2002/0054491 A1 | 5/2002 | Casas | |
| 2003/0193314 A1 * | 10/2003 | Solingen | 320/107 |
| 2004/0223342 A1 * | 11/2004 | Klipstein et al. | 362/555 |
| 2004/0257044 A1 * | 12/2004 | Nagaoka | 320/132 |

OTHER PUBLICATIONS

SKIL Power Tool & Accessory Catalog, p. 61, available prior to Sep. 3, 2004, showing a Model HD2940:71 worklight, Jul. 22, 2007.

DeWalt Product Specifications Document, available prior to Sep. 3, 2004, showing a Model DW902 cordless flashlight.

* cited by examiner

LIGHT

RELATED APPLICATIONS

This patent application claims the benefit of prior filed, co-pending U.S. provisional patent application Ser. No. 60/625,818, filed Nov. 7, 2004, the entire content of which is hereby incorporated by reference.

BACKGROUND OF THE INVENTION

The present invention generally relates to a light and, more particularly, to a battery-powered light.

SUMMARY OF THE INVENTION

In some constructions and in some aspects, the invention provides a light having a control circuit to perform various functions to enhance operation of the light. In one construction, the circuit can provide an indication to a user that an incorrect light source is connected to the light. In another construction, the circuit can limit the current being supplied to a light source with a lower voltage rating. In a further construction, the circuit can provide a low voltage detection module. In still a further construction, the circuit can provide a sleep circuit to reduce parasitic current draw.

In some constructions and in some aspects, the invention provides a battery-powered light including a body and a control circuit. The body includes a battery support portion and houses a light source. The battery support portion is operable to physically support a battery pack. The light source is electrically connectable to the battery pack and able to receive a discharge current from the battery pack. The light source is also operable to emit light. The control circuit is supported by the body and is operable to control the discharge current being supplied to the light source.

In some constructions and in some aspects, the invention provides a combination including a battery pack and a light. The battery pack includes at least one battery cell operable to supply a discharge current, a first switch operable to interrupt the supply of discharge current, and a first circuit operable to control the switch to interrupt the supply of discharge current and operable to sense at least one battery condition during an interruption of supply of discharge current. The light includes a body housing a light source, a second switch having a conducting state and a non-conducting state, low voltage monitor and a second circuit. The light source is electrically connectable to the battery pack and able to receive the discharge current from the at least one battery cell. The second switch is operable to interrupt the supply of discharge current when in the non-conducting state. The low voltage monitor is operable to sense a voltage of the battery pack and operable to control the second switch to interrupt the supply of discharge current when the voltage of the battery pack is at least one of equal to or less than a predetermined voltage threshold. The a second circuit is operable to sense the interruption of supply of discharge current controlled by the first switch in the battery pack and is operable to prevent the low voltage monitor from controlling the second switch to the non-conducting state when the voltage of the battery pack is approximately less than the predetermined voltage threshold during the interruption of supply of discharge current controlled by the first switch.

In some constructions and in some aspects, the invention provides a light operable to receive a discharge current from the battery pack. The battery pack has a voltage. The light includes a body housing a light source, a switch and a low voltage monitor. The light source is electrically connectable to a battery pack and able to receive the discharge current from the battery pack. The switch is supported by the body and has a conducting state and a non-conducting state. The switch is operable to interrupt the supply of discharge current when in the non-conducting state. The low voltage monitor is operable to sense a voltage of the battery pack and operable to control the second switch to interrupt the supply of discharge current when the voltage of the battery pack is approximately less than a predetermined voltage threshold.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

A light 40 is illustrated in FIGS. 9-16 and shown connected to a battery 50 in FIGS. 1-8. The light 40 is configured to receive power from a power source, such as, for example, the battery 50. As shown in FIGS. 1-8, the battery 50 is a removable, rechargeable battery. In some constructions and in some aspects, the light 40 can be configured for receiving power from a battery similar to or including features of those batteries shown and described in co-pending U.S. patent application Ser. No. 10/720,027, filed Nov. 20, 2003, entitled METHOD AND SYSTEM OF BATTERY PROTECTION, in co-pending U.S. patent application Ser. No. 10/721,800, filed Nov. 24, 2003, entitled BATTERY PACK, in co-pending U.S. patent application Ser. No. 11/138,070, filed May 24, 2005, entitled METHOD AND SYSTEM OF BATTERY PROTECTION, in co-pending U.S. patent application Ser. No. 11/165,615, filed Jun. 22, 2005, entitled BATTERY PACK, the entire contents of all of which are hereby incorporated by reference.

In the illustrated constructions, the light 40 is configured to receive power from a battery 50 having a nominal voltage of approximately 28 V. In the illustrated constructions, the light 40 is also configured to receive power from a battery having a nominal voltage less than 28 V, such as, for example, approximately 12 V, approximately 14.4 V, approximately 18 V, approximately 21 V, and the like. In further constructions, the light 40 can receive power from a battery having a nominal voltage greater than 28 V.

Figure 18:
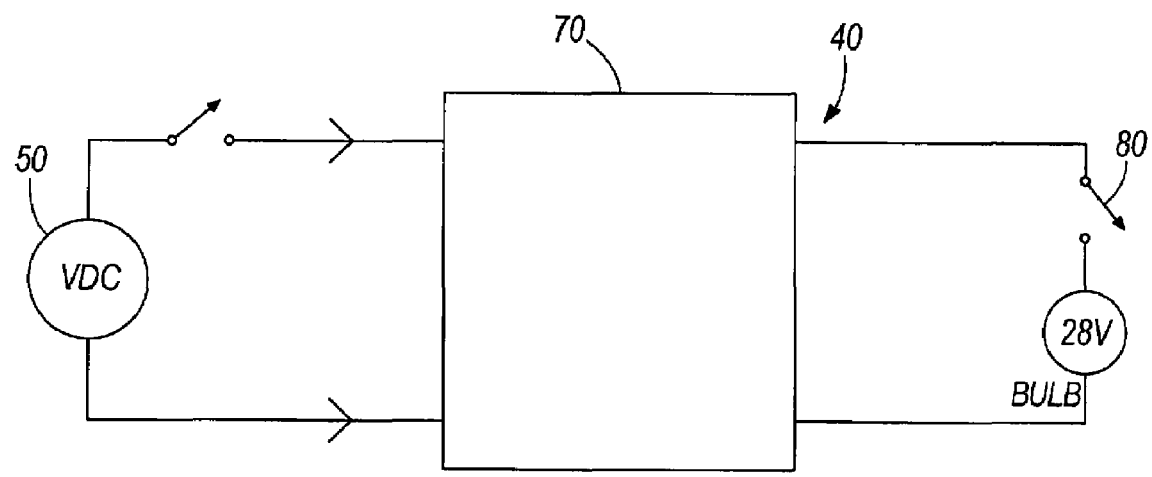
FIG. 18 is a schematic diagram of a light and a battery.
Figure 19:
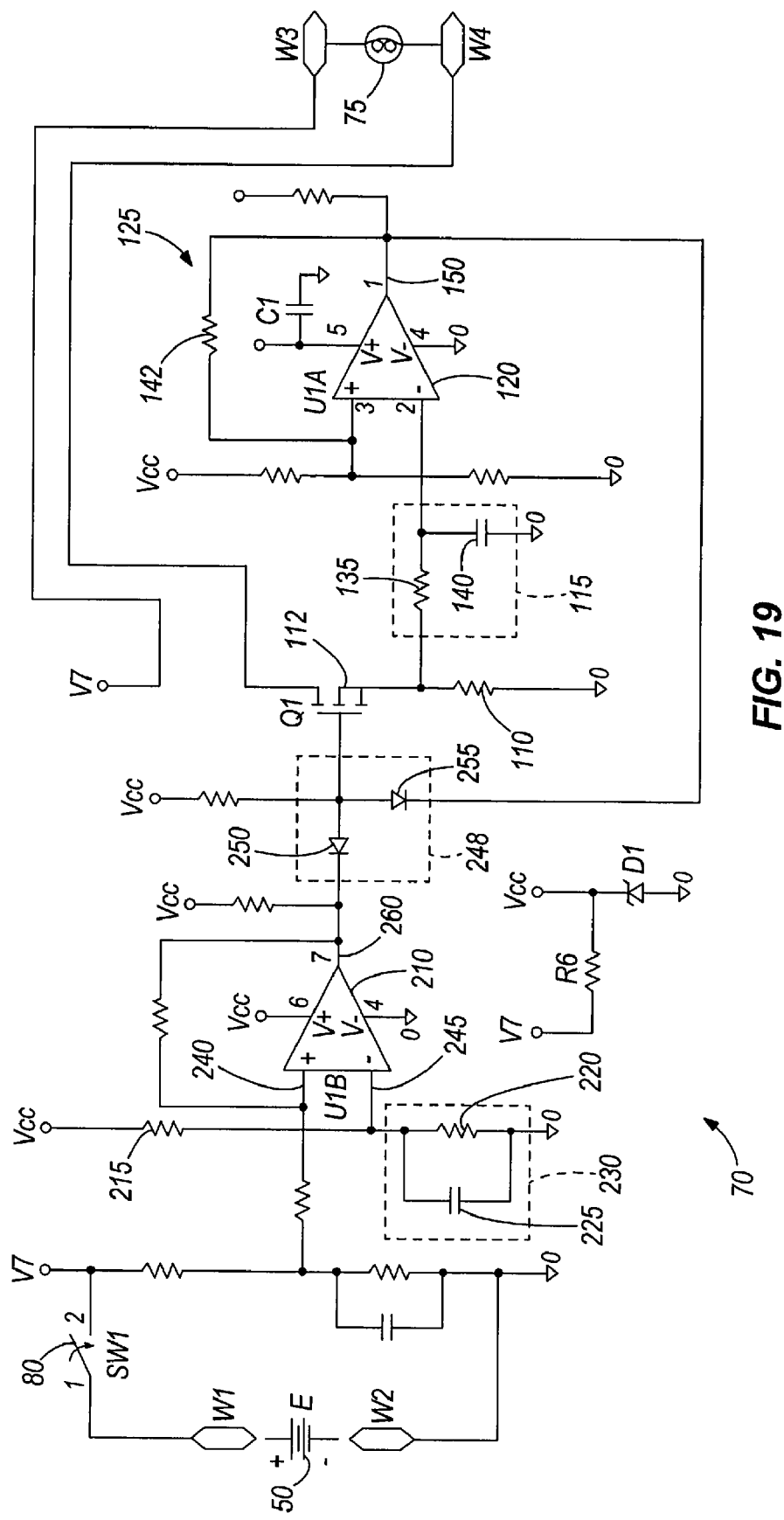
FIG. 19 is a schematic diagram of a circuit included in a light, such as the light shown in FIGS. 1, 9 and 17.
Figure 20:
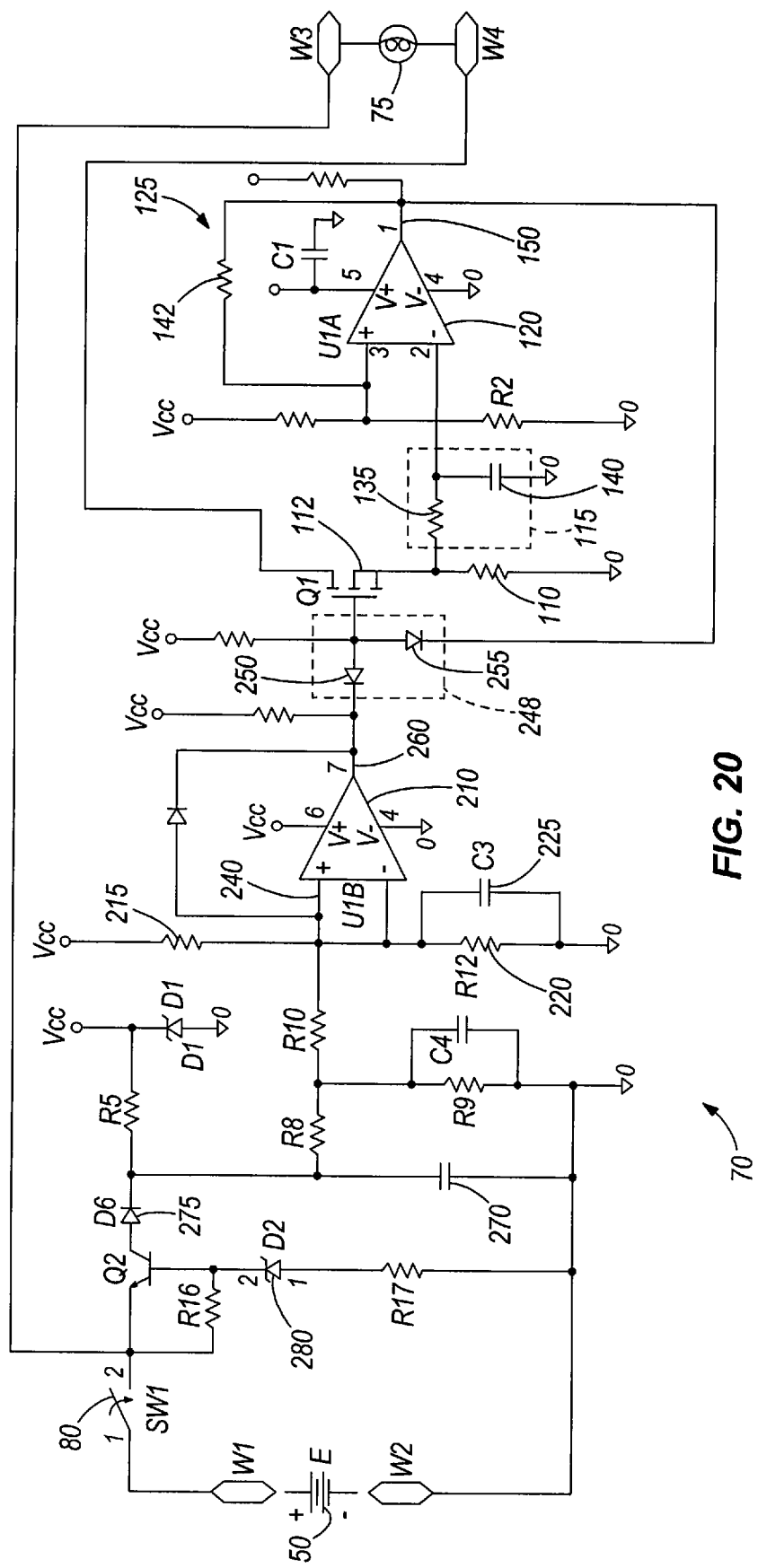
FIG. 20 is a schematic diagram of another construction of a circuit included in a light, such as the light shown in FIGS. 1, 9 and 17.

In the illustrated constructions, the light 40 includes a housing 60 supporting a circuit 70 (shown schematically in FIGS. 18, 19 and 20). In some constructions, the circuit 70 includes a light source 75 and a switch 80 which couples the light source 75 to the power source, such as, for example, the battery 50. The switch 80 is controlled by a user-activated on/off switch 85 supported by the housing 60. In some constructions, the on/off switch 85 includes a first position for disabling the light source 75 and a second position for enabling the light source 75. In other constructions, the on/off switch 85 can include more positions relating to various settings which control the brightness of the light source 75. For example, the on/off switch 85 can include a first position for disabling the light source 75, a second position for enabling the light source 75 in a high mode (e.g., full brightness), and a third position for enabling the light source 75 is a low mode (e.g., low brightness). In further constructions, the on/off switch 85 can include more positions than shown and described.

The housing 60 includes a battery support portion 52, a handle portion 54, and a head portion 56. The battery support portion 52 can physically support the battery 50 on the light 40 and on the housing 60. The battery support portion 52 also includes a terminal assembly (not shown) for electrically connecting the battery 50 to the circuit 70.

The handle portion 54 supports the user-activated on/off switch 85. As shown in FIGS. 2, 6, 10 and 13, the on/off switch 85 is positioned on the rear side 90 of the handle portion 54. In other constructions, the on/off switch 85 can be located on another portion of the light 40.

Figure 1:
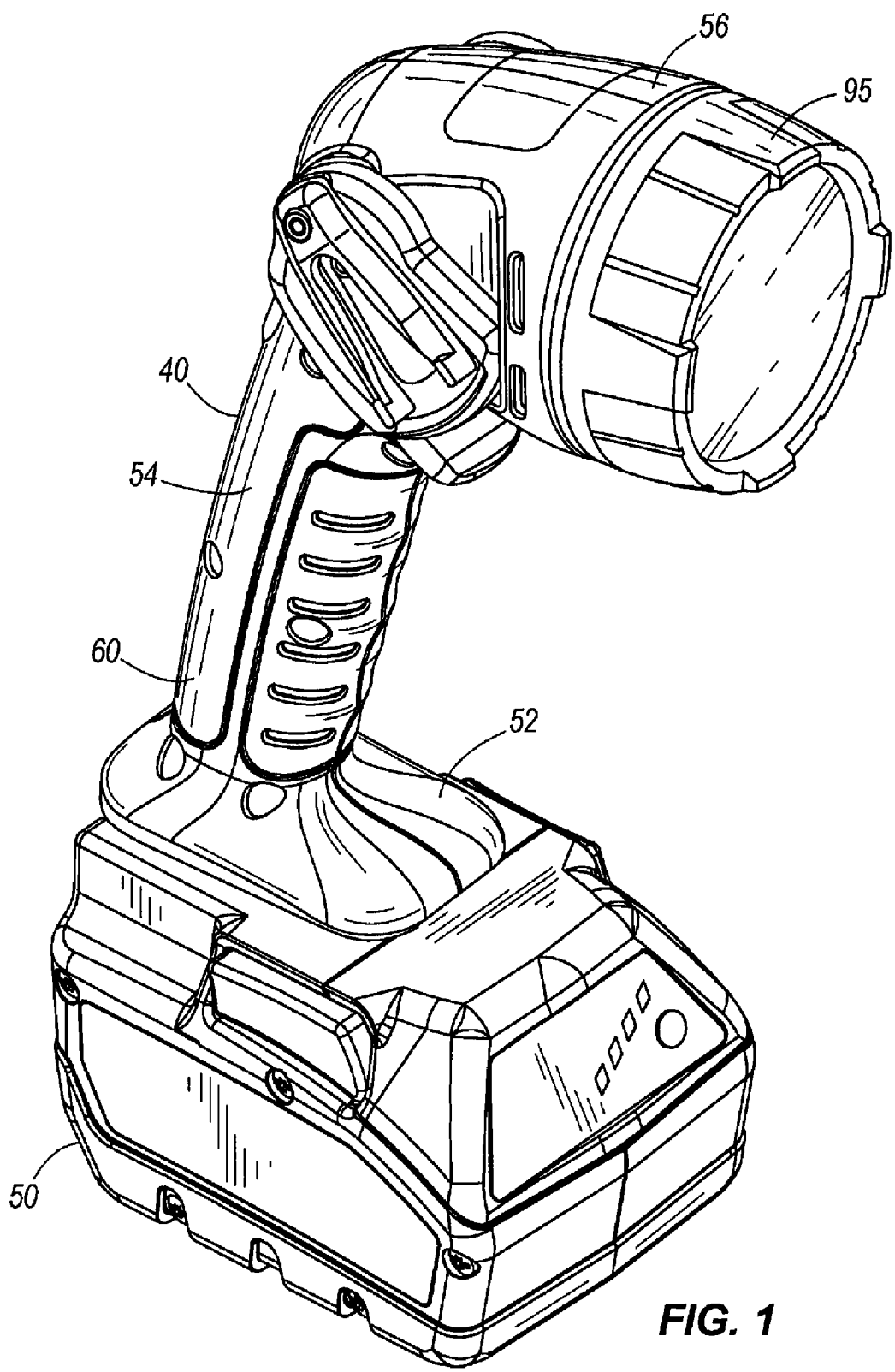
FIG. 1 is a front perspective view of a light and a battery.
Figure 2:
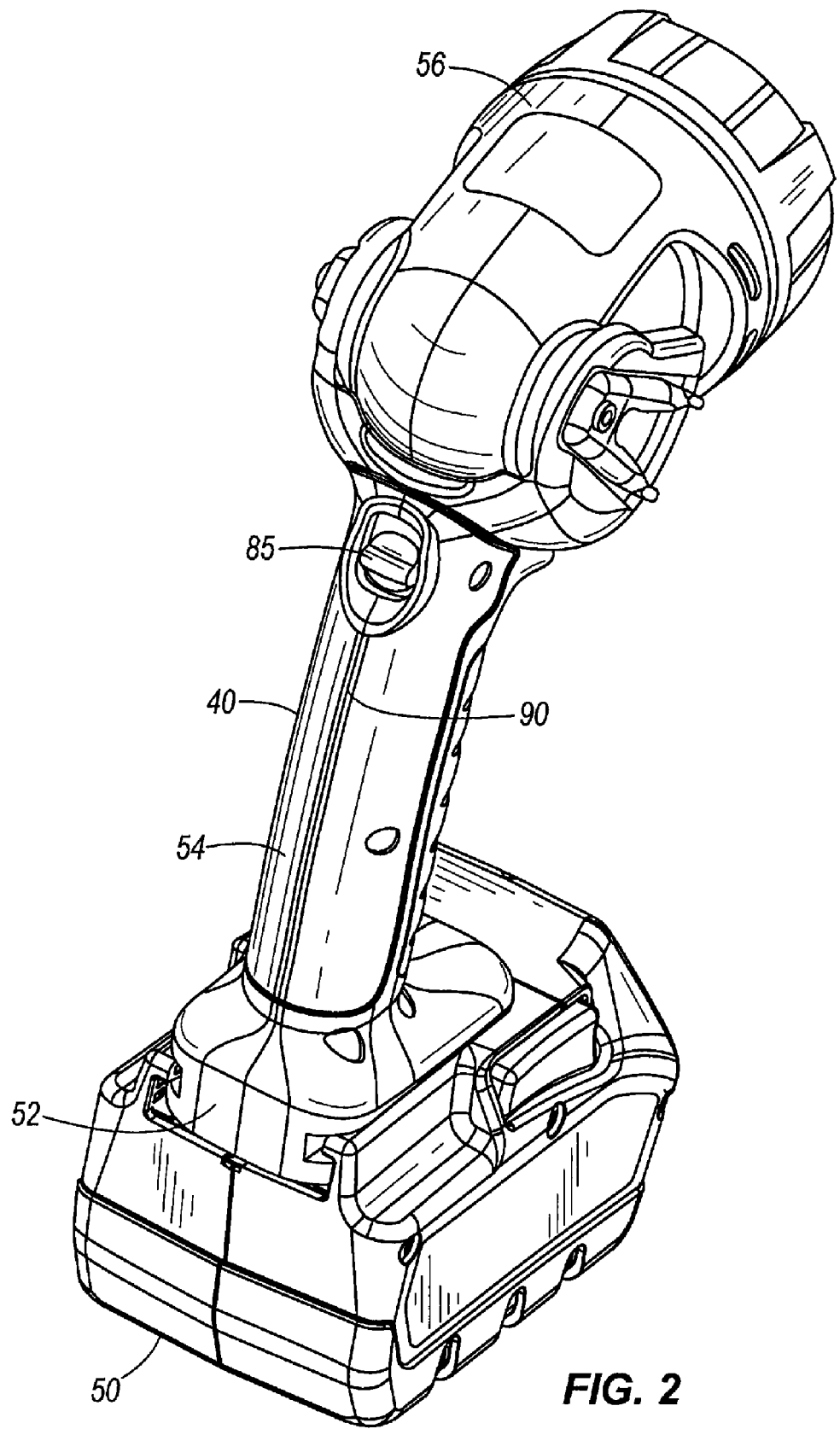
FIG. 2 is a rear perspective view of the light and the battery shown in FIG. 1.
Figure 3:
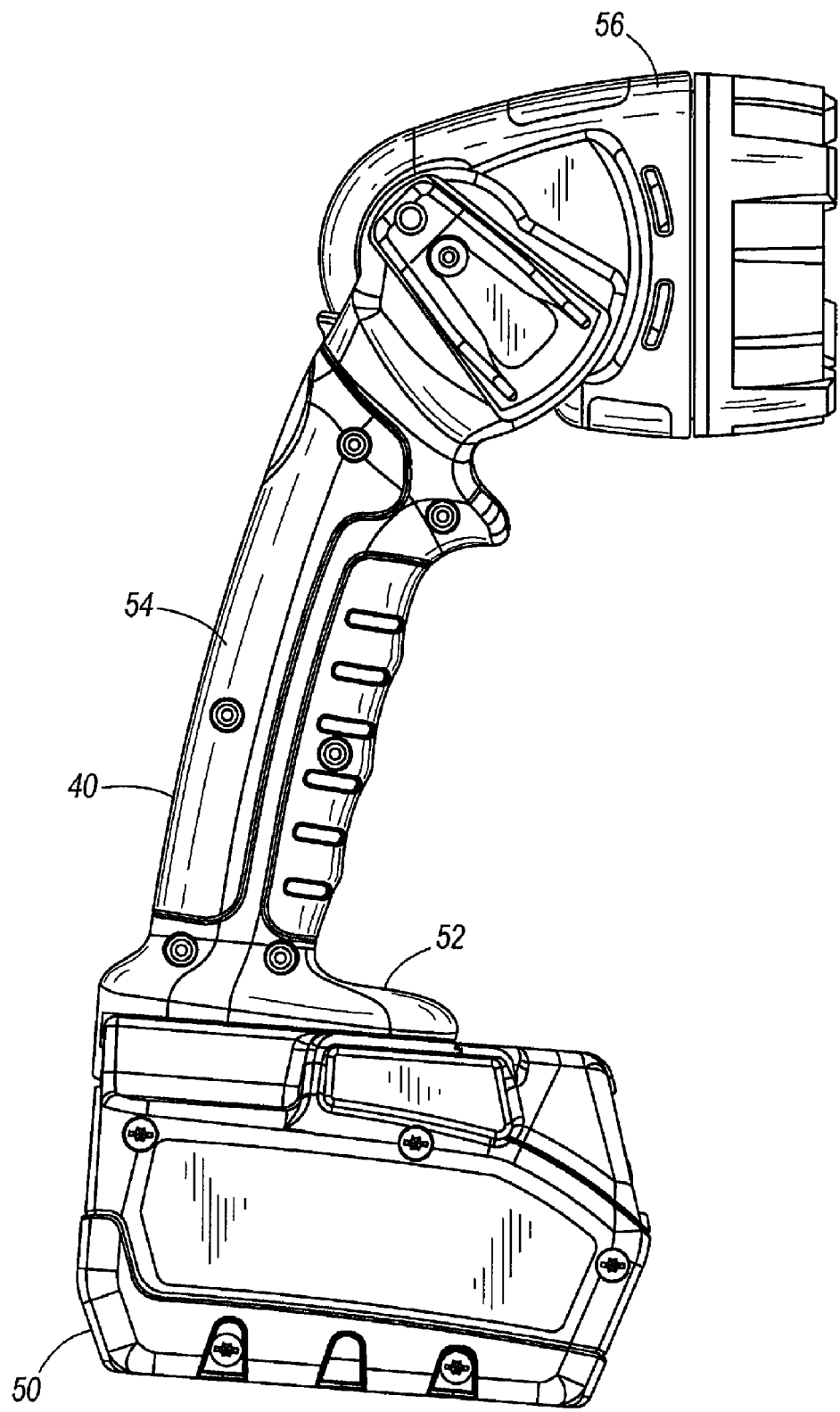
FIG. 3 is a side view of the light and the battery shown in FIG. 1.
Figure 4:
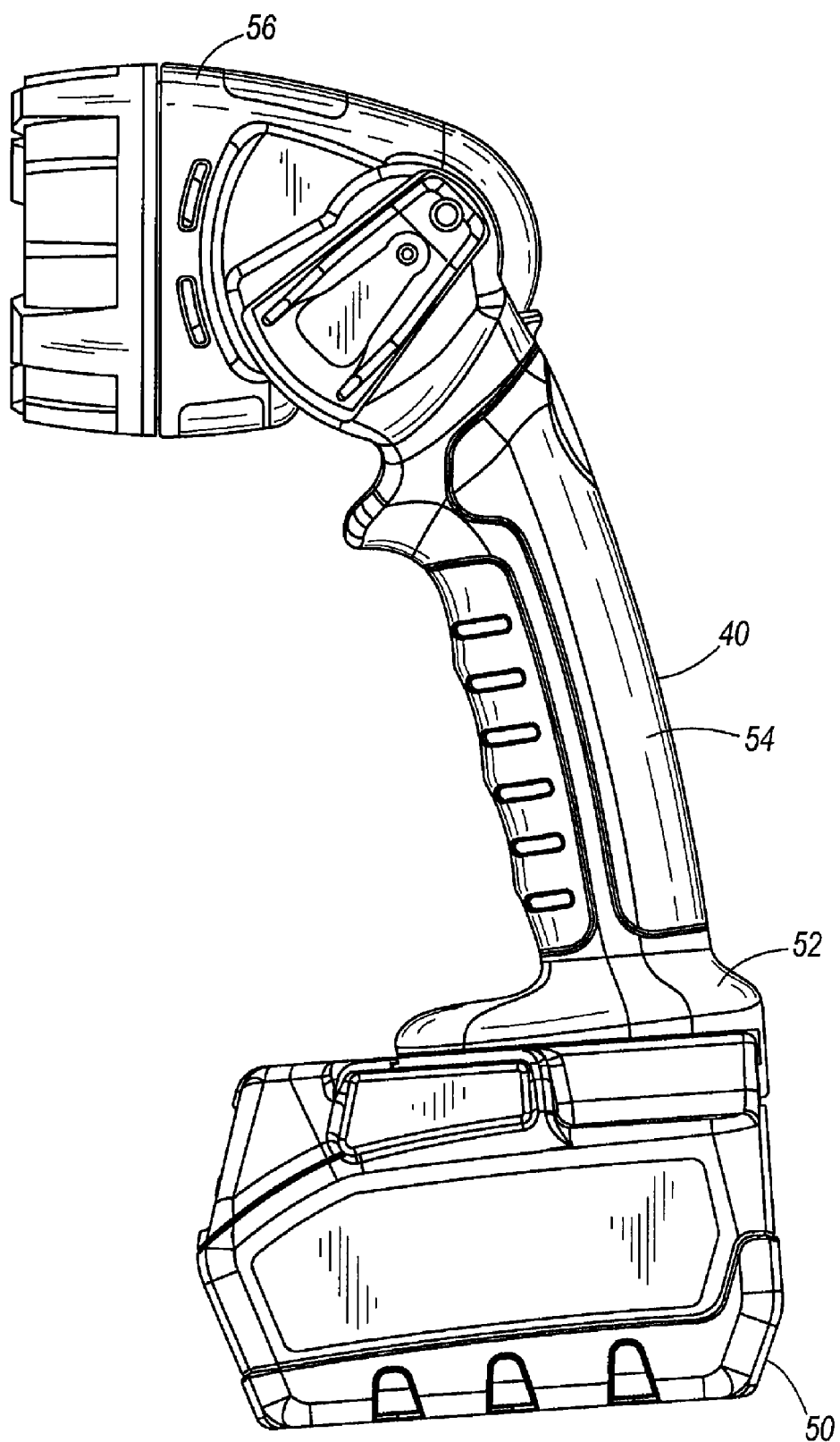
FIG. 4 is another side view of the light and the battery shown in FIG. 1.
Figure 5:
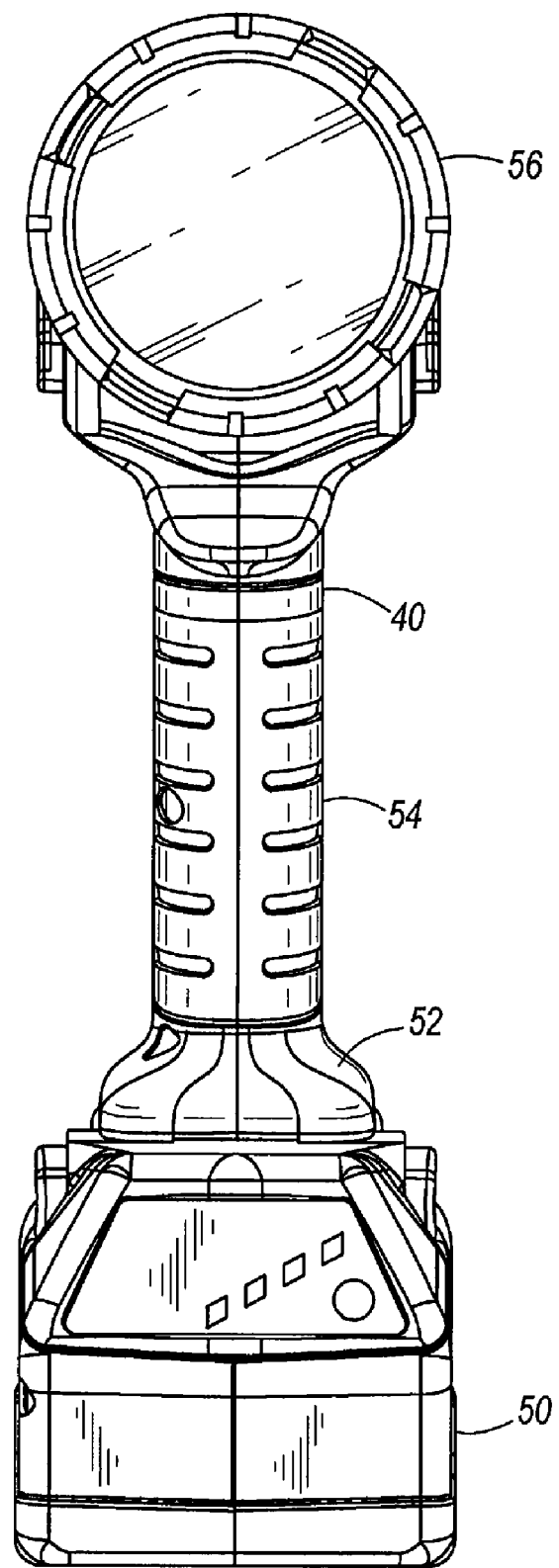
FIG. 5 is a front view of the light and the battery shown in FIG. 1.
Figure 6:
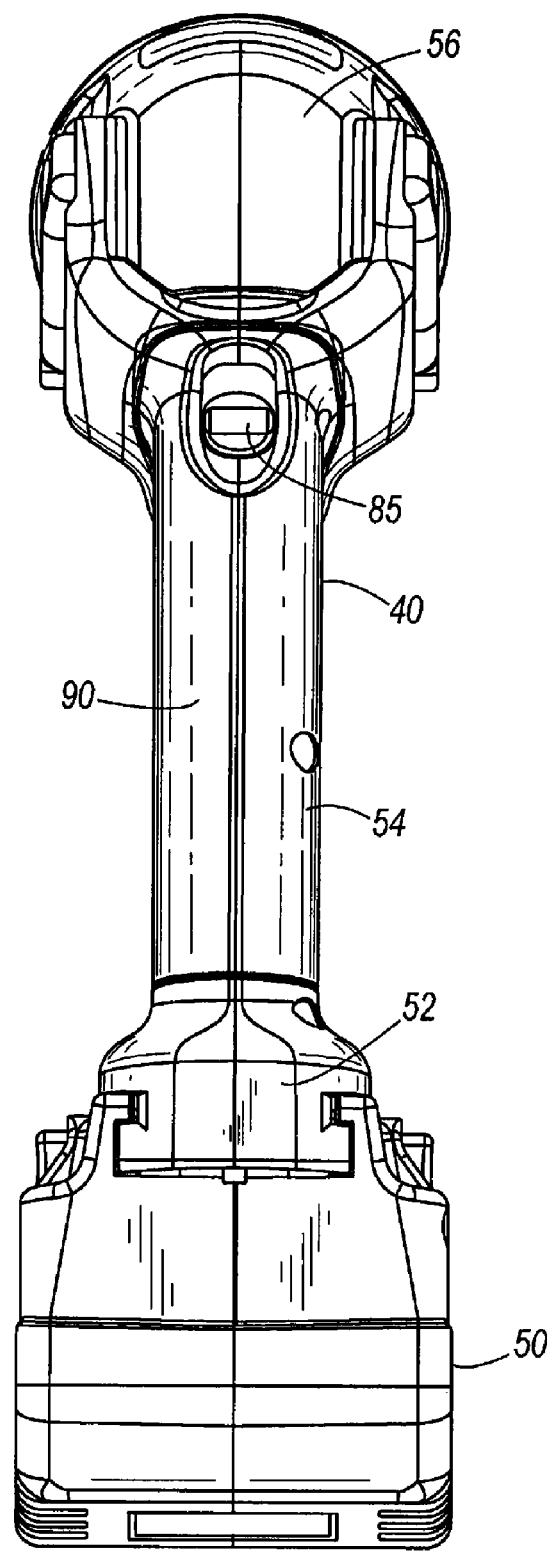
FIG. 6 is a rear view of the light and the battery shown in FIG. 1.
Figure 7:
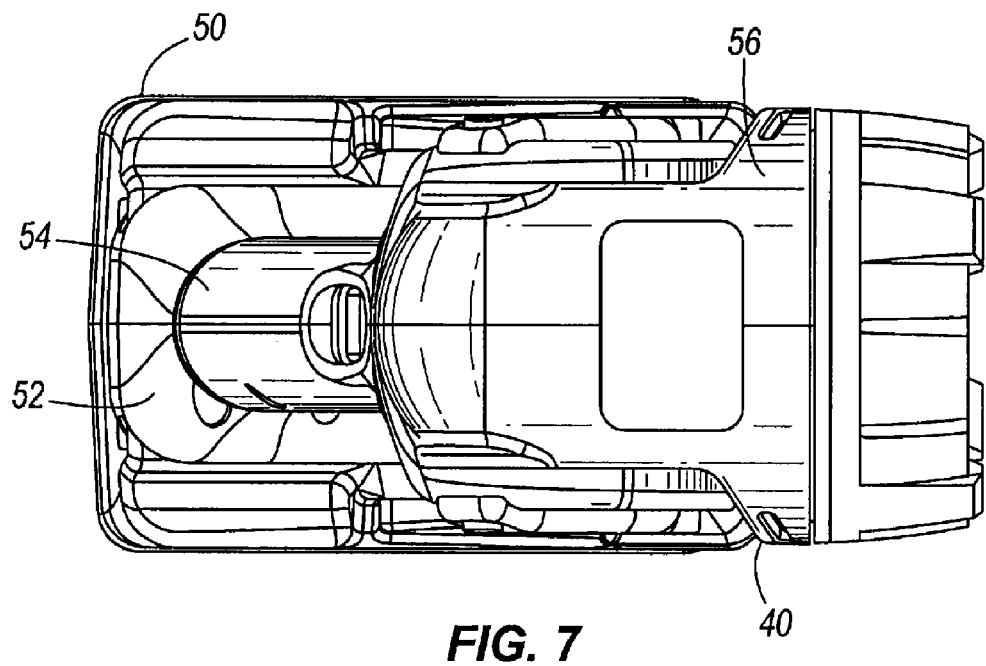
FIG. 7 is a top view of the light and the battery shown in FIG. 1.
Figure 8:
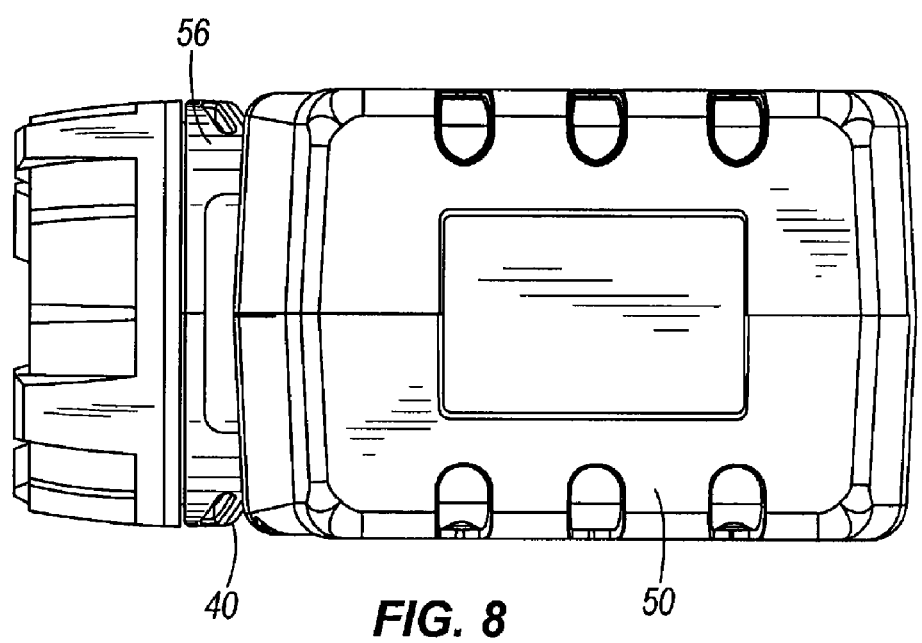
FIG. 8 is a bottom view of the light and the battery shown in FIG. 1.
Figure 9:
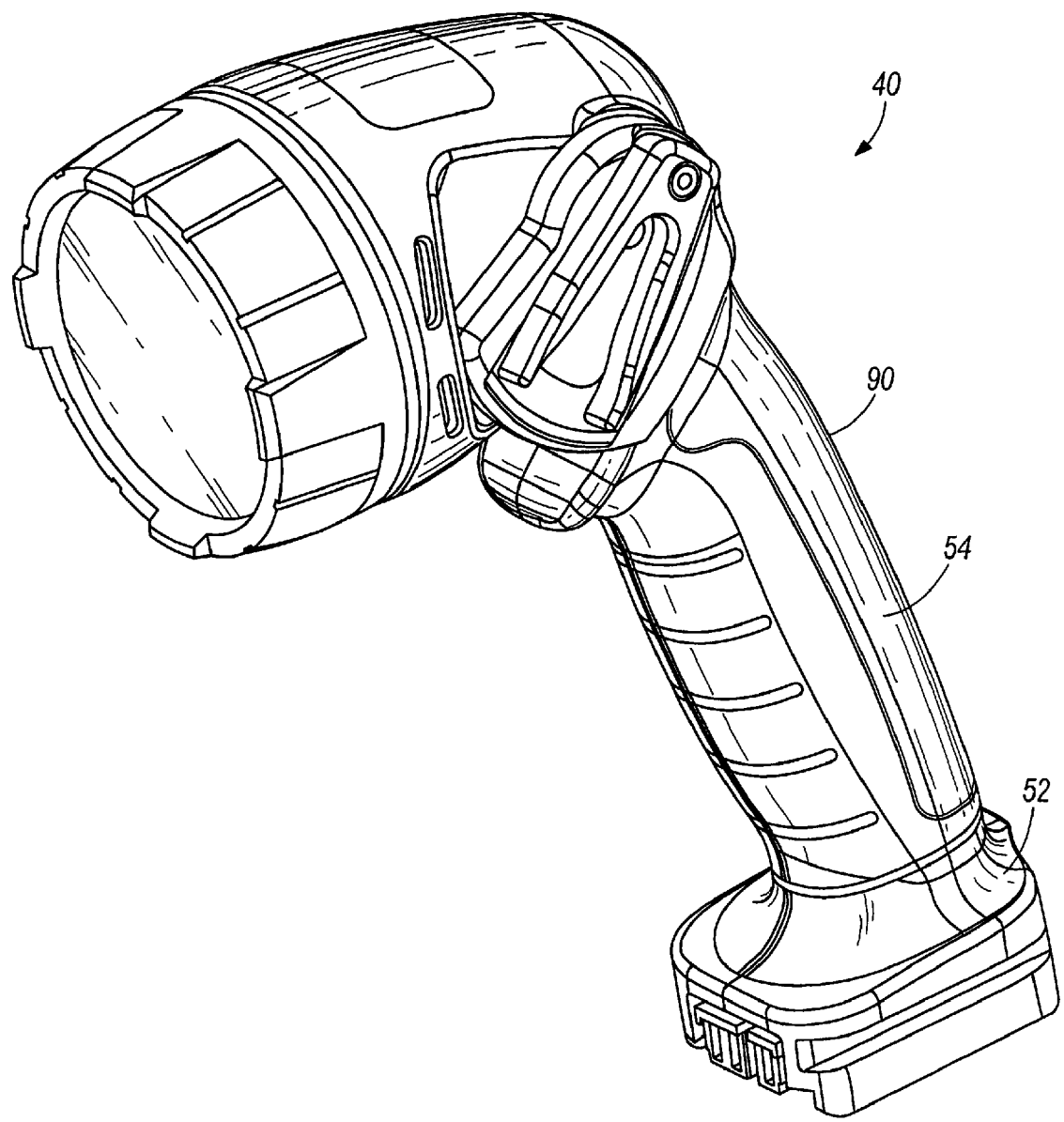
FIG. 9 is a front perspective view of another construction of a light.
Figure 10:
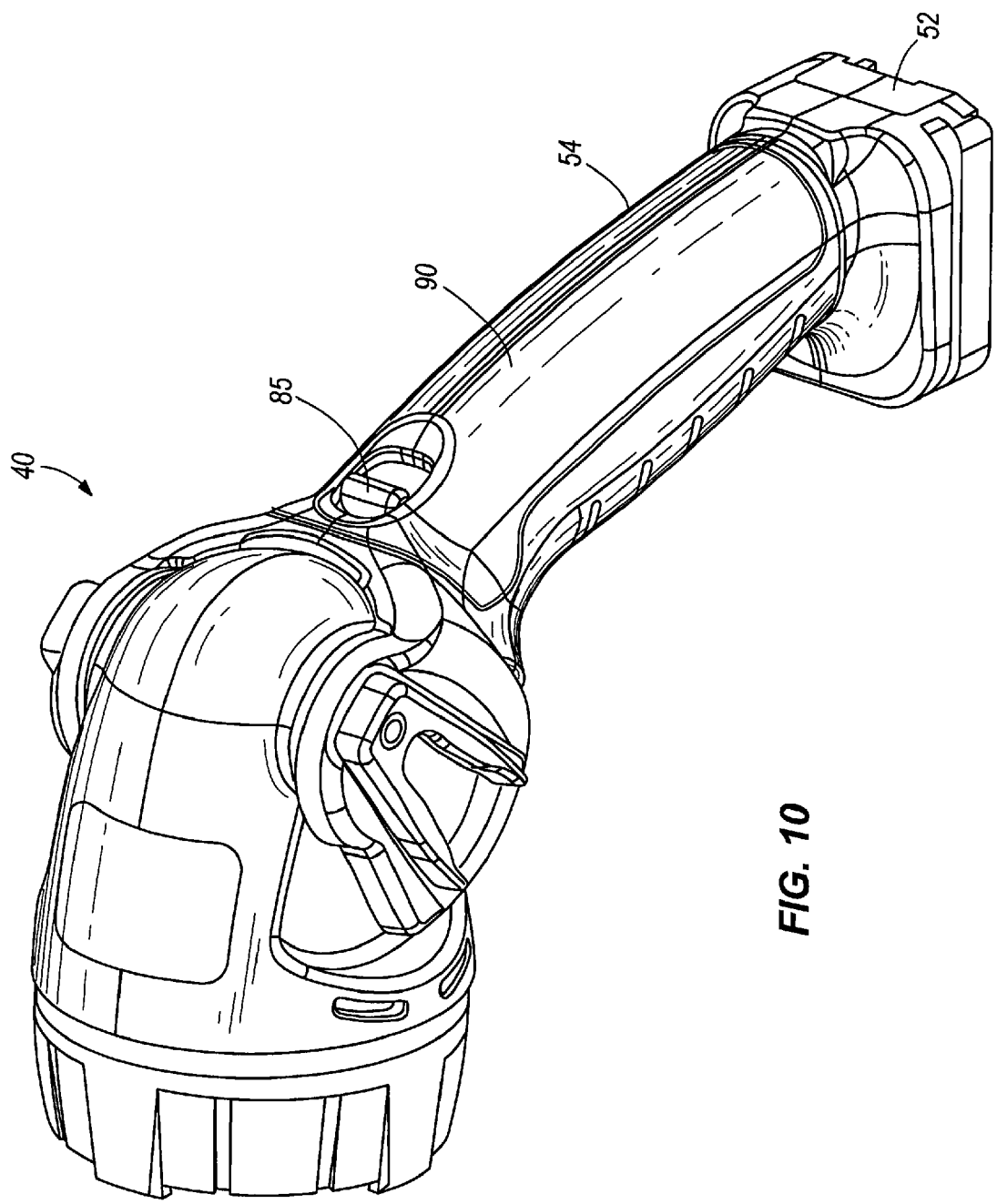
FIG. 10 is a rear perspective view of the light shown in FIG. 9.
Figure 11:
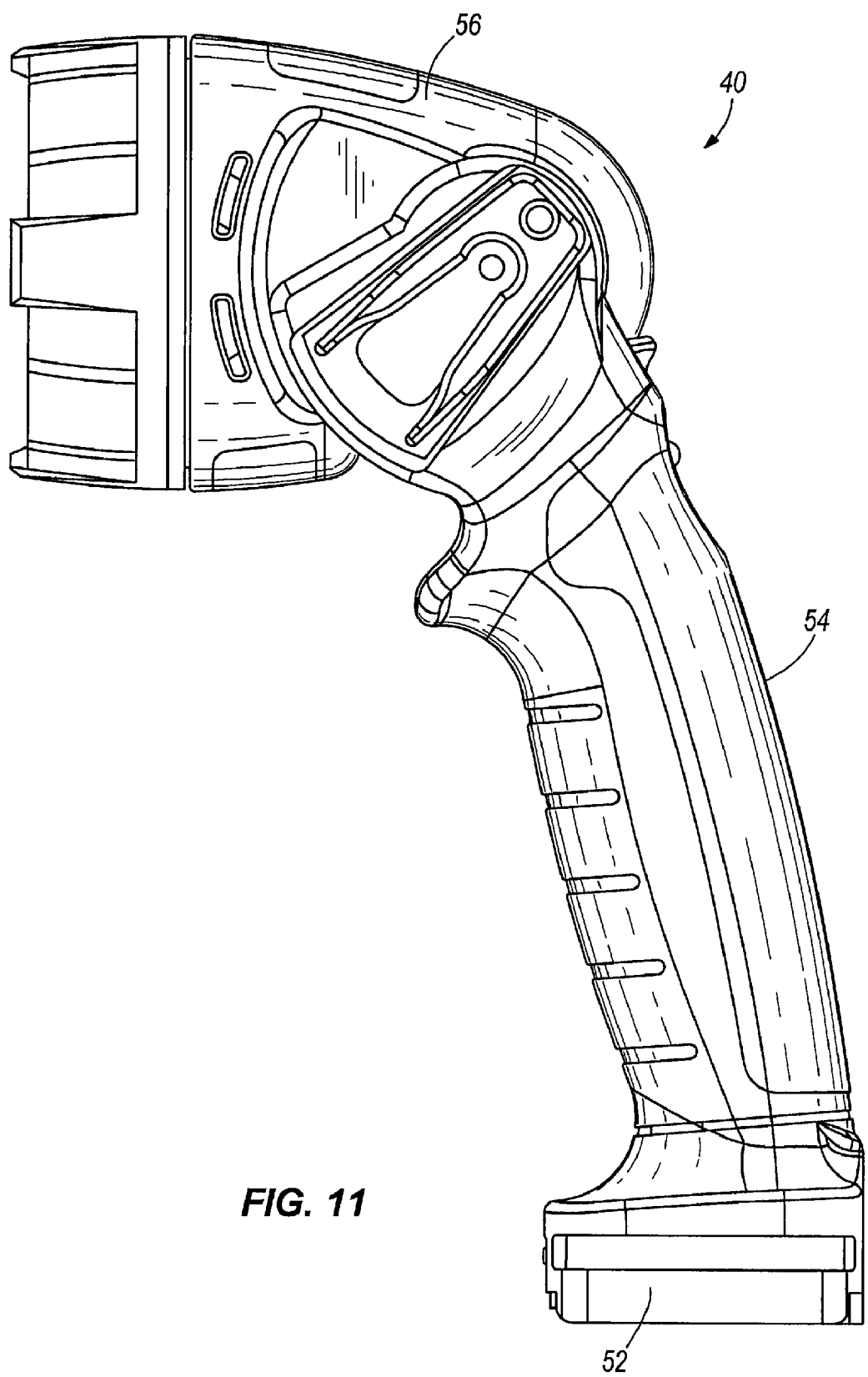
FIG. 11 is a side view of the light shown in FIG. 9.
Figure 12:
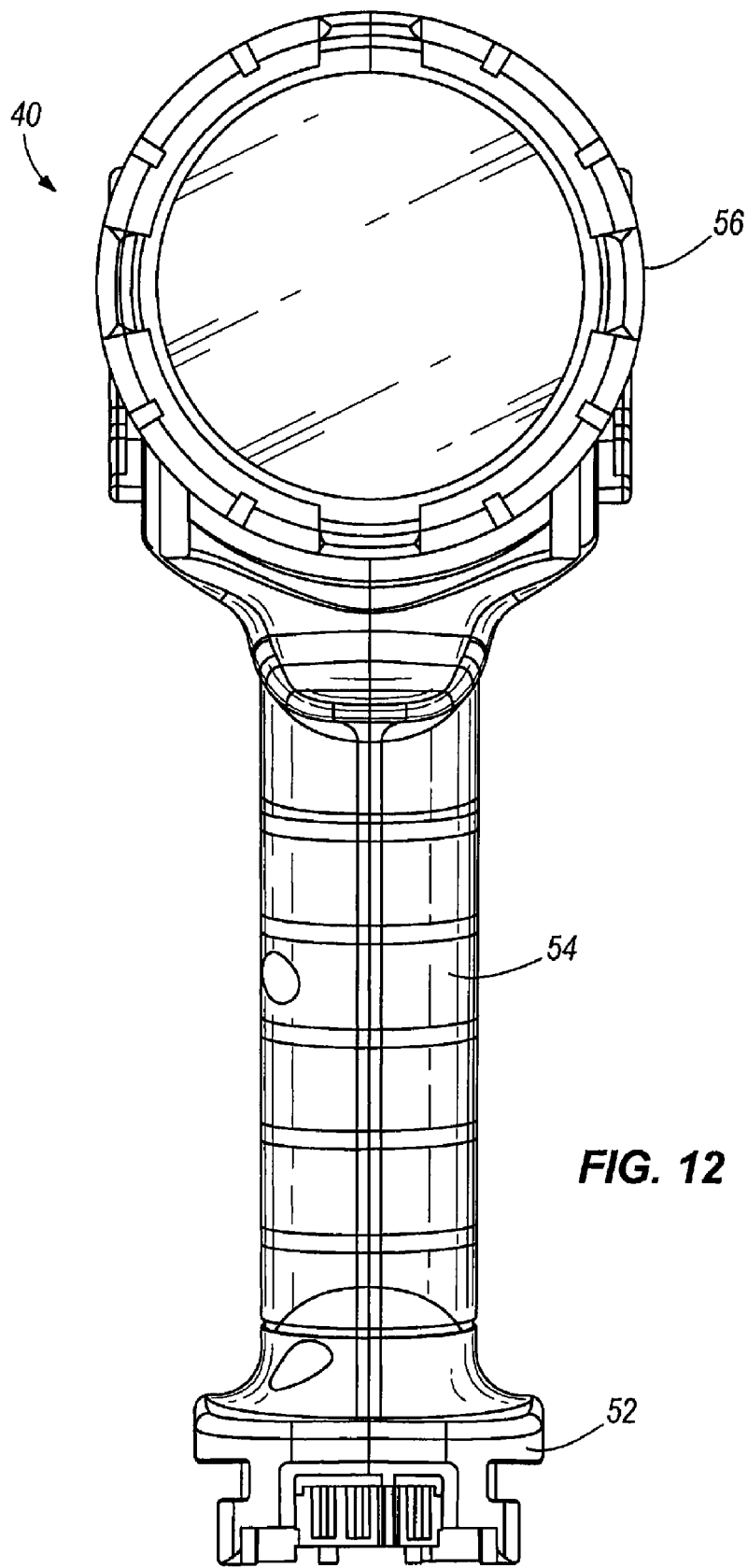
FIG. 12 is a front view of the light shown in FIG. 9.
Figure 13:
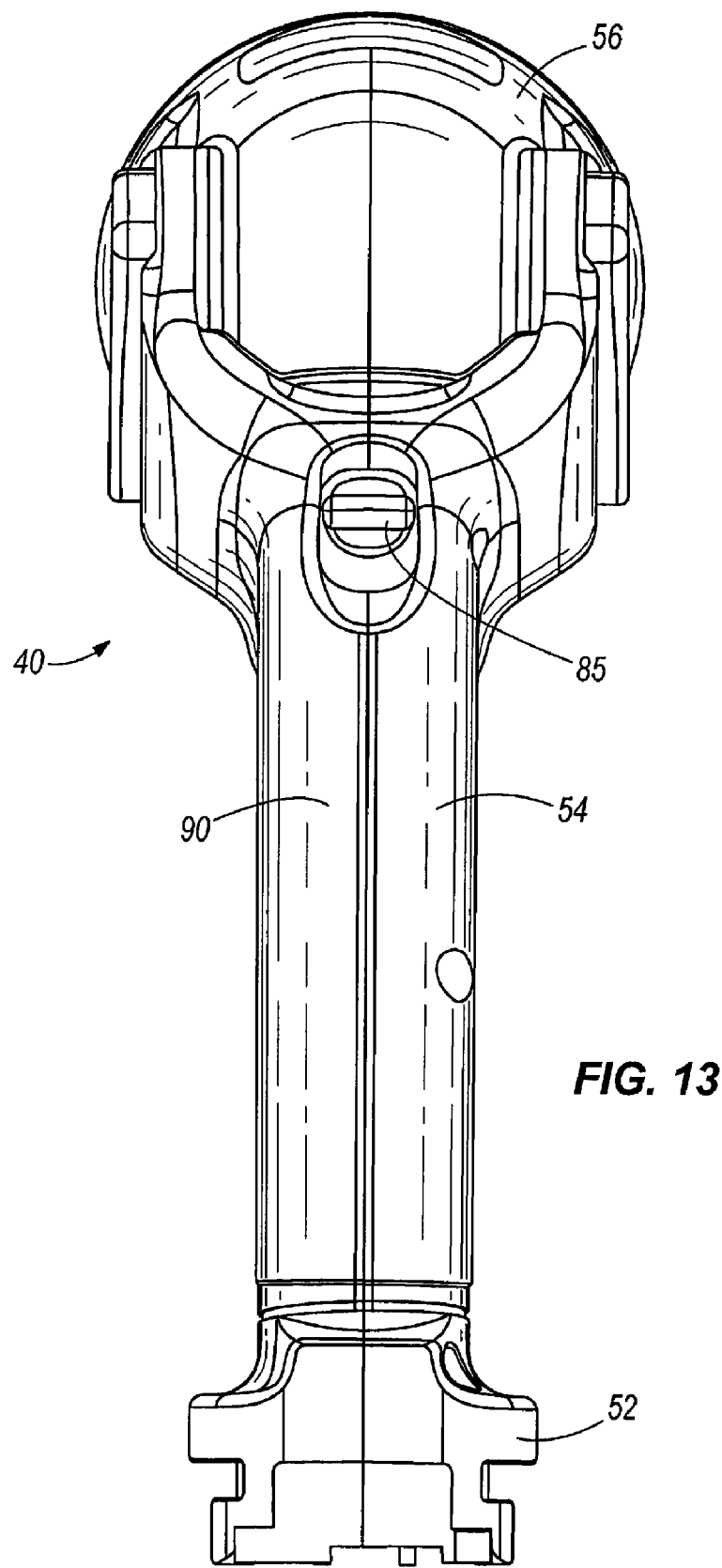
FIG. 13 is rear view of the light shown in FIG. 9.
Figure 14:
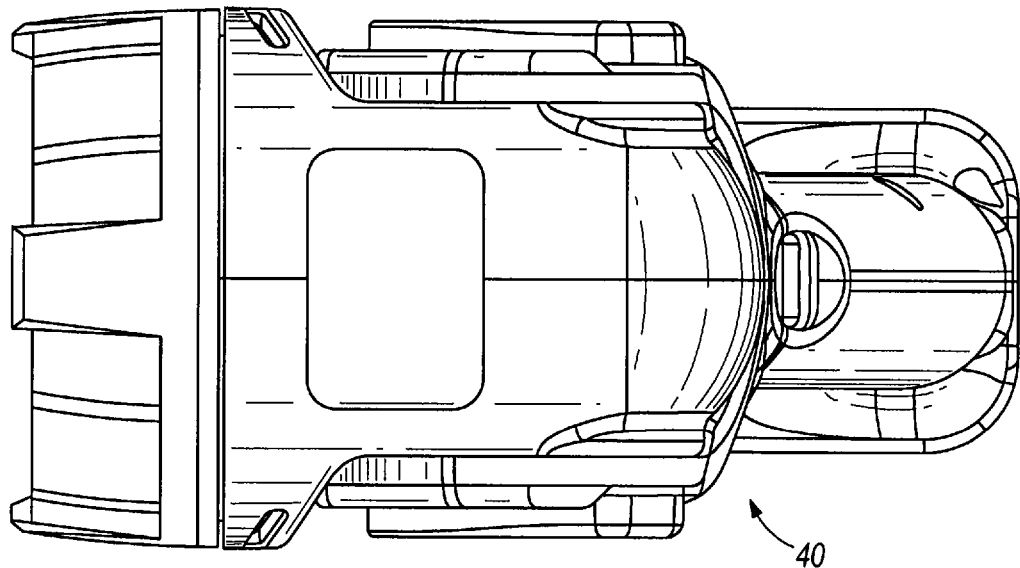
FIG. 14 is a top view of the light shown in FIG. 9.
Figure 15:
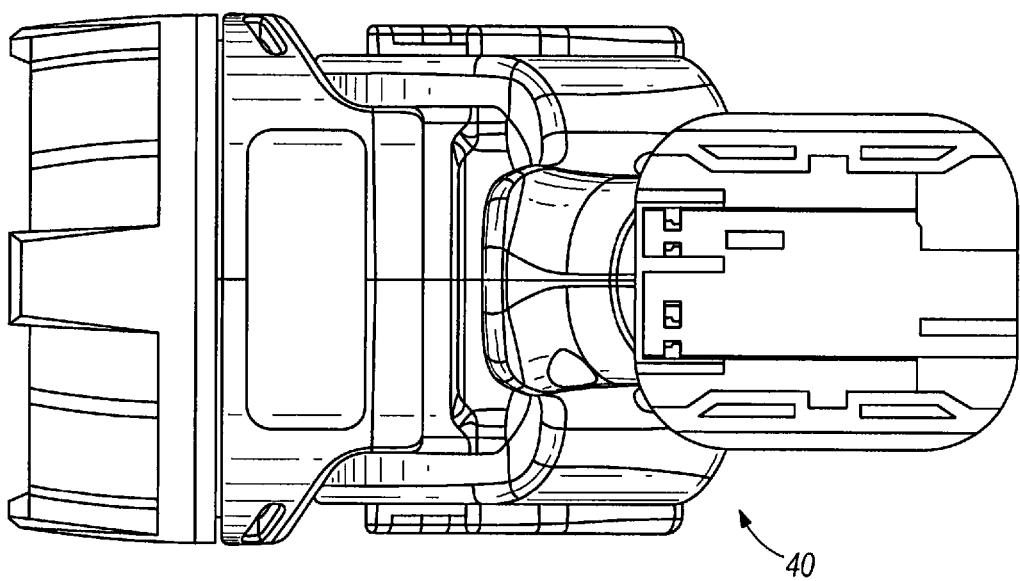
FIG. 15 is a rear view of the light shown in FIG. 9.
Figure 16:
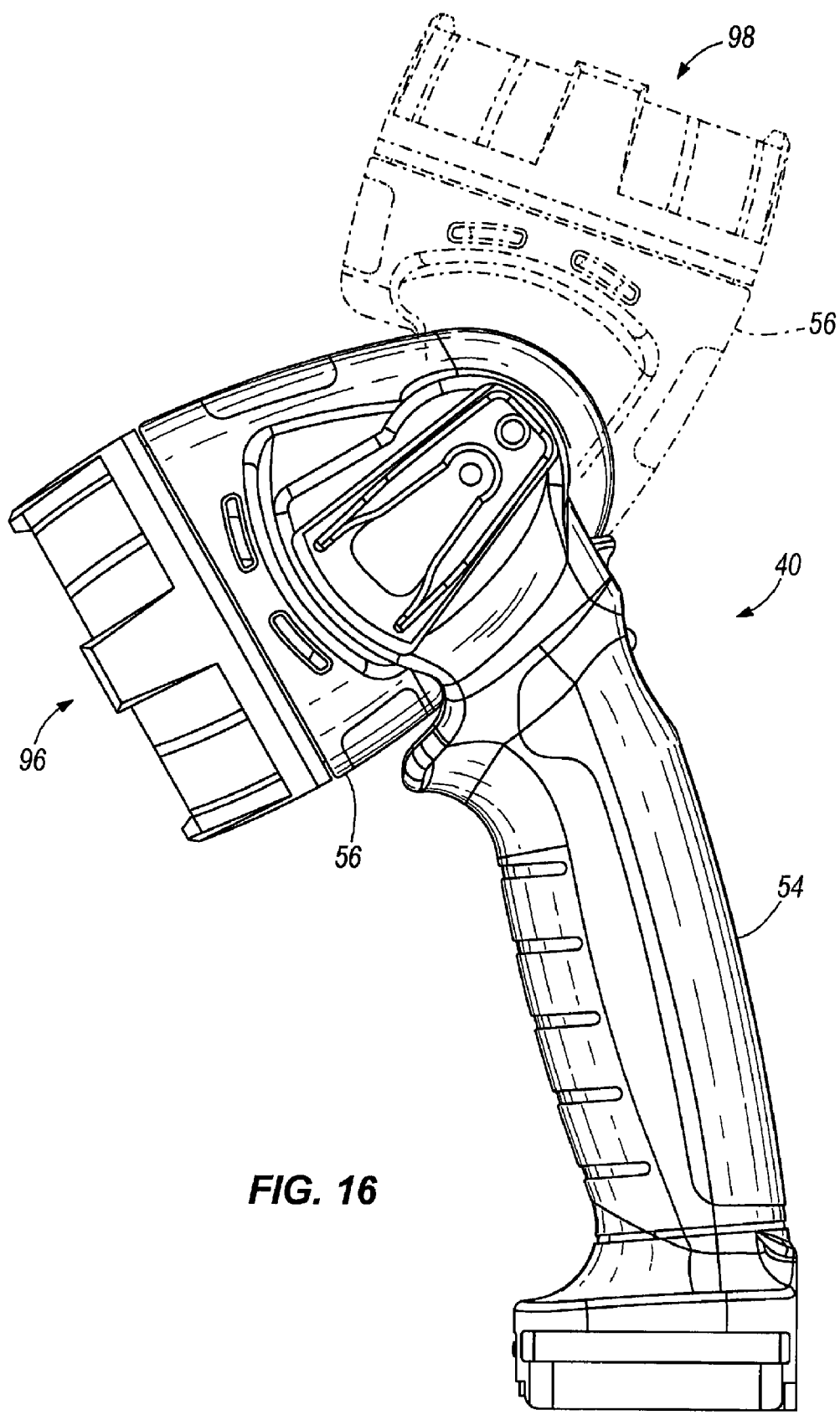
FIG. 16 is another side view of the light shown in FIG. 9 and illustrating two orientations of the light.
Figure 17:
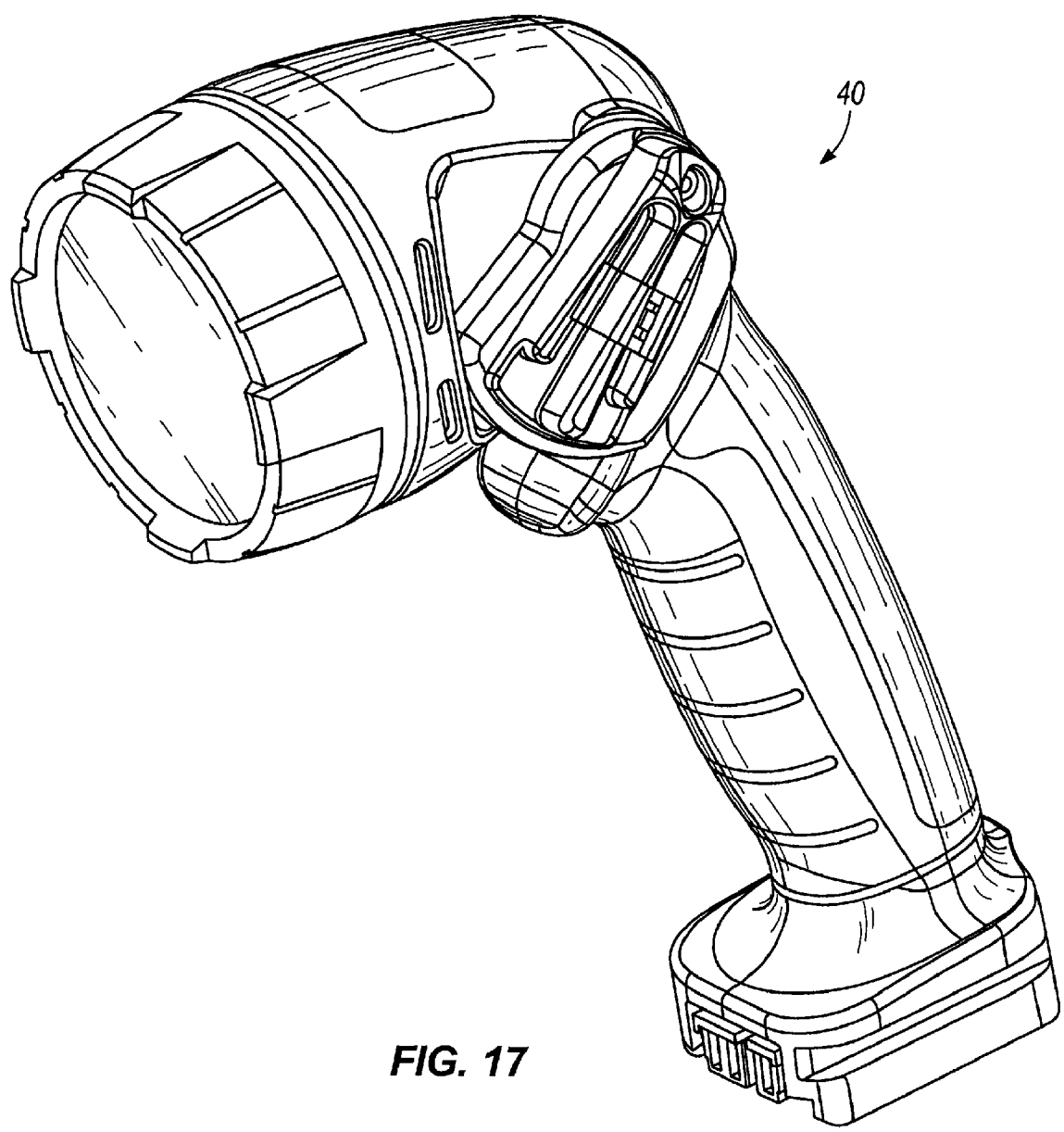
FIG. 17 is a front perspective view of another construction of a light and a bit holder.

The head portion 56 of the light 40 includes a light source receptacle (not shown) which couples the light source 75 to the control circuit 70. The head portion 56 includes a removable cover 95 for providing access to the light source 75. As shown in FIG. 16, the head portion 56 can pivot back and forth between a first position 96 and a second position 98.

One construction of the control circuit 70 is shown schematically in FIG. 19. As mentioned previously, the circuit 70 includes a light source 75. In one construction, the light source 75 includes a removable 28 V light bulb. In other constructions, the light source 75 includes a removable light bulb having a different voltage rating. In further constructions, the light source 75 can include a light emitting diode. In still further constructions, the light source 75 can include multiple light sources, such as, for example, two or more light bulbs, two or more light emitting diodes, a combination of bulbs and diodes, or the like.

As shown in FIG. 19, the circuit 70 includes a current shunt 110 that is positioned in series with the light source 75 and a semiconducting switch 112. In the illustrated construction, the semiconducting switch 112 includes a field effect transistor ("FET"), such as, for example, a metal oxide semiconducting field effect transistor ("MOSFET"). The circuit 70 also includes an RC delay network 115, a first comparator 120, and a duty-cycle control module 125. The RC delay network 115 includes a first resistor 135 and a capacitor 140. The duty-cycle control module 125 includes a second resistor 142 and the resistor 135 and the capacitor 140 of the RC delay network 115.

In the construction illustrated in FIG. 19, the circuit 70 can sense if an incorrect light bulb 75 has been inserted into the light source receptacle (not shown). For example, a user may insert a light bulb 75 having a lower voltage rating, such as, for example, a 12 V light bulb, a 14.4 V light bulb, an 18 V light bulb, or the like. When the circuit 70 senses an incorrect light source 75, the circuit 70 can also perform one of two functions, depending on a few of the ratings of various components included in the circuit 70.

In a first construction, when the circuit 70 senses an incorrect light source 75 inserted in the light source receptacle, the circuit 70 will indicate to the user that an incorrect light source 75 is connected to the circuit 70. For example, the circuit 70 can provide indication to the user by controlling the light source 75 (e.g., the light bulb) to flash on and off. In one example, the circuit 70 will flash the light source 75 on and off between approximately 0.5 cycles per second or approximately 1 cycle per second. According to this aspect, the light source 75 would be flashing on and off in such a manner that would render the light 40 useless for providing sufficient light to a user.

In a second construction, when the circuit 70 senses an incorrect light source 75 inserted in the light source receptacle, the circuit 70 will limit the current being supplied to the light source 75. The circuit 70 would limit the current in order to enable the light 40 to function with a lower-rated light source 75. In the second construction, the circuit 70 limits the current supplied to the light source 75 by flashing the light source 75 on and off. However, in the second construction, the circuit 70 is controlling the light source to flash at a higher rate per second such that the flashing would not be readily apparent to a user. The duty-cycle control module 125 controls the output 150 of the comparator 120 in a hysteretic manner. The ratings of the first resistor 135, the second resistor 142 and the capacitor 140 determine the upper and lower hysteretic threshold values of the comparator 120.

For both the first and second constructions, if a lower voltage bulb 75 is inserted in the light 40, the filament resistance of the light source 75 will be lower. Thus, a light source 75 with a lower voltage rating will have a higher current rating. The voltage dropped across the current shunt 110 is fed into the RC delay network 115. This voltage is in turn fed into the comparator 120 with a set point of reference. A lower voltage light source 75 will create a large voltage across the RC delay network 115 and once the reference voltage is tripped, the output 150 of the comparator 120 toggles. The toggled output 150 biases the semiconducting switch 112 back and forth between a conducting state and a non-conducting state. When the semiconducting switch 112 is biased into a non-conducting state, the capacitor 140 slowly discharges. The light source 75 remains off until the lower hysteretic value is reached. Once the comparator 120 resets, the light source 75 will turn on.

As shown in FIG. 19, the circuit 70 can also include a low voltage monitor 205. In some constructions, the low voltage monitor 205 can monitor the voltage of the battery 50 supplying power to the light 40 and can turn the light source 75 off at a first preset voltage level. Once the battery voltage drops below the first preset value, the light 40 will not be activated until the battery voltage rises above a second preset value. In some constructions, the first preset value is lower than the second preset value. In one construction, the low voltage monitor 205 can be reset when the on/off switch 80 is toggled off and back on. For example, the low voltage monitor 205 can set the first preset value to approximately 24 V and can set the second preset value to approximately 27 V. In other constructions, the low voltage monitor 205 can include higher or lower preset values than described above.

As shown in FIG. 19, the low voltage monitor 205 includes a second comparator 210. The comparator 210 is controlled using a preset point of reference defined by the ratings of a third resistor 215 and a fourth resistor 220. A second capacitor 225 along with the fourth resistor 220 create a time delay network 230. The time delay network 230 can ensure the battery voltage applied to the second comparator 210 at pin 240 has reached a steady state before the reference voltage applied to the second comparator 210 at pin 245 reaches a steady state value. The time delay network 230 can ensure no nuisance tripping of the low voltage battery monitor 205.

Still referring to FIG. 19, a logic AND gate 248 is formed by a first diode 250 and a second diode 255. Once both comparator outputs are high then the semiconducting switch 112 is biased to a conducting state and the light source 75 will turn on. Similarly, if the output 260 of the second comparator 210 is low, the semiconducting switch 112 is biased to a non-conducting state and the light source 75 will turn off.

Another construction of the circuit 70 is shown in FIG. 20. In the illustrated construction, the circuit 70 includes a "hold-up" capacitor 270 and a steering diode 275. In some constructions, the battery 50 can include a microcontroller which may be programmed to periodically measure certain battery characteristics. In these constructions, the microcontroller briefly interrupts the discharge current for approximately 0.5 ms per second in order to obtain the measurements. If such a battery is supplying power to the light 40, the hold-up capacitor 270 allows the circuit 70 to ignore the brief interruptions of discharge current which can cause the low voltage monitor 205 to trip during every interruption (causing the light source 205 to flash once every second). The steering diode 275 is positioned within the circuit 70 to prevent the light source 75 from pulling energy out of the hold-up capacitor 270 during the interruptions of discharge current.

Still referring to FIG. 20, the circuit 70 can also include a sleep subcircuit to reduce parasitic current draw when the battery 50 is still electrically connected to the light 40, but the light 40 is not turned on. The low voltage monitor 205 will shut off the light 40 when the battery reaches the first preset voltage threshold, such as, for example, approximately 26 V. When the battery voltage continues to fall and reaches a third voltage threshold, such as, for example, approximately 25.5 V, a zener diode 280 will begin to stop conducting. A first transistor 285 will stay conducting until the battery voltage reaches a fourth voltage threshold, such as, for example, approximately 25 V. Once the fourth voltage threshold is reaches, the zener diode 280 has stopped conducting completely and the first transistor 285 is cutoff. In one construction, for example, the control circuit 70 reduces the parasitic current from approximately 7 mA to approximately 0.1 uA.

The constructions described above and illustrated in the figures are presented by way of example only and are not intended as a limitation upon the concepts and principles of the present invention.

The invention claimed is:

1. A battery-powered light comprising:
    a body having a battery support portion and housing one or more light sources, the battery support portion operable to physically support a battery pack, the one or more light sources being electrically connectable to the battery pack and able to receive a discharge current from the battery pack, the one or more light sources operable to emit light, wherein the one or more light sources include a light bulb having a first voltage rating; and
    a control circuit supported by the body, the control circuit being compatible with a plurality of different types of light sources by controlling the discharge current being supplied to the one or more light sources,
    wherein the control circuit is operable to sense at least one of a light source condition and a battery voltage condition and to control the discharge current being supplied to the one or more light sources based on at least one of the light source condition and the battery voltage condition, the light source condition including whether the first voltage rating of the light bulb is lower than a predetermined voltage rating for the one or more light sources.

2. The battery-powered light as set forth in claim 1 and further comprising a switch included in the control circuit, the switch operable to interrupt the discharge current being supplied to the one or more light sources; and
    wherein the control circuit is compatible with light sources of different voltage ratings or different current ratings.

3. The battery-powered light as set forth in claim 1 and wherein the control circuit includes a switch operable to interrupt the discharge current being supplied to the one or more light sources; and
    wherein the control circuit is operable to control the switch such that the switch interrupts the discharge current at a first rate if the first voltage rating of the light bulb is lower than a predetermined voltage rating of the one or more light sources.

4. The battery-powered light as set forth in claim 3 and wherein the control circuit provides indication to a user that the one or more light sources includes a light bulb having a lower voltage rating than the predetermined voltage rating of the one or more light sources when the switch is being operated at the first rate.

5. The battery-powered light as set forth in claim 4 and wherein the first rate includes a rate of approximately 0.5 cycles per second.

6. The battery-powered light as set forth in claim 4 and wherein the first rate includes a rate of approximately 1 cycle per second.

7. The battery-powered light as set forth in claim 3 and wherein the first rate interrupts the discharge current at a rate that limits the current being supplied to the lower voltage rated light bulb and still enables operation of the one or more light sources.

8. The battery-powered light as set forth in claim 1 and wherein the control circuit includes a switch operable to interrupt the discharge current being supplied to the one or more light sources; and wherein the control circuit is operable to sense a battery voltage of the battery pack and operable to control the switch such that the switch interrupts the discharge current when the battery voltage of the battery pack is approximately less than a predetermined threshold.

9. A battery-powered light comprising:

a body having a battery support portion and housing one or more light sources, the battery support portion operable to physically support a battery pack, the one or more light sources being electrically connectable to the battery pack and able to receive a discharge current from the battery pack, the one or more light sources operable to emit light, wherein the one or more light sources have a first voltage rating; and a control circuit supported by the body, the control circuit being compatible with a plurality of different light sources by controlling a switch to interrupt the discharge current being supplied to the one or more light sources based on a sensed light source condition, the light source condition including whether the first voltage rating is different than a predetermined voltage rating, wherein the control circuit is operable to control the switch such that the switch interrupts the discharge current at a first rate if the first voltage rating of a light bulb is lower than the predetermined voltage rating of the one or more light sources.

10. The battery-powered light as set forth in claim 9 and wherein the control circuit is compatible with light sources of different voltage ratings or different current ratings.

11. The battery-powered light as set forth in claim 9 and wherein the control circuit is operable to sense at least one of a light source condition and a battery voltage condition; and wherein the control circuit is operable to control the discharge current being supplied to the one or more light sources based on the at least one of the light source condition and the battery voltage condition.

12. The battery-powered light as set forth in claim 9 and wherein the control circuit provides indication to a user that the one or more light sources includes a light bulb having a lower voltage rating than the predetermined voltage rating of the one or more light sources when the switch is being operated at the first rate.

13. The battery-powered light as set forth in claim 12 and wherein the first rate includes a rate of approximately 0.5 cycles per second.

14. The battery-powered light as set forth in claim 12 and wherein the first rate includes a rate of approximately 1 cycle per second.

15. The battery-powered light as set forth in claim 9 and wherein the first rate interrupts the discharge current at a rate that limits the current being supplied to the lower voltage rated light bulb and still enables operation of the one or more light sources.

16. The battery-powered light as set forth in claim 11 and wherein the control circuit is operable to sense a battery voltage of the battery pack and operable to control the switch such that the switch interrupts the discharge current when the battery voltage of the battery pack is approximately less than a predetermined threshold.

17. The battery-powered light as set forth in claim 9 and wherein the one or more light sources include at least one light emitting diode.

* * * * *